(12) United States Patent
Binder et al.

(10) Patent No.: US 6,833,272 B1
(45) Date of Patent: Dec. 21, 2004

(54) METHOD AND APPARATUS FOR DETERMINING THE STORAGE STATE OF AN AMMONIA-STORING SCR CATALYST

(75) Inventors: Klaus Binder, Deizisau (DE); Tillmann Braun, Berglen (DE); Michael-Rainer Busch, Ebersbach (DE); Aleksandar Knezevic, Kirchheim/Teck (DE); Klaus-Jürgen Marquardt, Remshalden (DE); Ralf Moos, Friedrichshafen (DE); Carsten Plog, Markdorf (DE)

(73) Assignee: DaimlerChrysler AG, Stuttgart (DE)

( * ) Notice: Subject to any disclaimer, the term of this patent is extended or adjusted under 35 U.S.C. 154(b) by 219 days.

(21) Appl. No.: 09/608,761

(22) Filed: Jun. 30, 2000

(30) Foreign Application Priority Data

Jul. 6, 1999 (DE) .......................................... 199 31 007

(51) Int. Cl.[7] .............................................. G01N 31/10
(52) U.S. Cl. ........................ 436/37; 436/147; 436/149; 436/151
(58) Field of Search .......................... 436/37, 147, 149, 436/151, 183

(56) References Cited

U.S. PATENT DOCUMENTS

| | | | | |
|---|---|---|---|---|
| 3,977,836 A | * | 8/1976 | Matsuda et al. | |
| 5,143,696 A | | 9/1992 | Haas et al. | |
| 5,369,956 A | | 12/1994 | Daudel et al. | |
| 5,546,004 A | | 8/1996 | Schmelz | |
| 5,748,002 A | * | 5/1998 | Scott et al. .................. | 324/633 |
| 6,004,524 A | * | 12/1999 | Morsbach et al. ....... | 423/239.1 |
| 6,650,121 B2 | * | 11/2003 | Seipler et al. .............. | 324/446 |

FOREIGN PATENT DOCUMENTS

| | | |
|---|---|---|
| DE | 4117143 | 11/1992 |
| DE | 4217552 | 8/1993 |
| DE | 19536571 | 4/1997 |
| DE | 19635977 | 3/1998 |
| EP | 426989 | 5/1991 |
| EP | 554766 | 8/1993 |
| JP | 4-338217 | * 11/1992 |
| JP | 4-346819 | * 12/1992 |
| WO | 98/10272 | * 3/1998 |

OTHER PUBLICATIONS

D'Amico, A. et al, Ultrasonics Symposium Proceedings 1987, 633–636.*
Kurzweil, P. et al, Sensors and Actuators B 1995, 24–25, 653–656.*
Tronconi, E. et al, Chemical Engineering Science 1996, 51, 2965–2970.*
Monlux, G. et al, SPIE 1996, 2835, 236–247.*
K. Tsutsumi et al, Bulletin of the CHemical Society of Japan 1975, 48, 3576–3580.*
A. D'Amico et al, Chem. Abstr. 1988, 109, abstract 162419q.*
P. Kurzweil et al, Chem. Abstr. 1995, 123, abstract 274487f.*

* cited by examiner

Primary Examiner—Arlen Soderquist
(74) Attorney, Agent, or Firm—Crowell & Moring LLP (57) ABSTRACT

A method for determining the storage state of an ammonia-storing SCR catalyst, the change in at least one physical property of the SCR catalyst material, changing with the $NH_3$ storing process, being sensed, the measurement taking place on the SCR catalyst material itself by applying a measuring pickup to the SCR catalyst or bringing it into direct contact with the latter and determining the storage state on the basis of these results. In an alternative embodiment, a material identical or similar to the SCR catalyst material with regard to its physical properties is arranged in the exhaust-gas stream in addition to the SCR catalyst material, and the change in at least one physical property of this substitute material changing with the $NH_3$ storing process, is sensed, the measurement taking place on the substitute material itself by applying the substitute material to the measuring pickup or bringing it into direct contact with the latter and determining the storage state of the SCR catalyst on the basis of these results.

7 Claims, 7 Drawing Sheets

Fig. 1

PRIOR ART

Fig. 2

PRIOR ART

Fig. 3

PRIOR ART

Fig. 4

PRIOR ART

METHOD AND APPARATUS FOR DETERMINING THE STORAGE STATE OF AN AMMONIA-STORING SCR CATALYST

BACKGROUND OF THE INVENTION

1. Technical Field

The invention relates to a method and an apparatus for determining the storage state of an ammonia-storing SCR catalyst.

2. Discussion

The main sources of nitrogen oxide emissions (NOx) in the industrialized states are traffic, fossil-fired power stations and industrial installations. While the power-station and industrial emissions are being increasingly reduced, the proportion accounted for by traffic is coming increasingly to the forefront.

The NOx emissions of petrol-operated spark-ignition engines can be drastically reduced by operating at $\lambda=1$ and by post-engine emission control by means of a three-way catalyst. Owing to the principle concerned, this possibility does not exist in the case of a mixture-regulated diesel engine operated with a mixture leaner than stoichiometric. On account of the high oxygen content in the exhaust gas, so far it has not been possible to produce a catalyst which can reduce the NOx emissions without the addition of reducing agents, generally hydrocarbons or ammonia-forming compounds.

To remove the nitrogen from power station emissions, SCR processes (selective catalytic reaction processes)— as described for example in DE 245888 —are used in order to convert nitrogen oxides selectively into water and nitrogen by adding the reducing agent ammonia ($NH_3$). Such control has proven suitable given the slow changes over time in the volumetric flow of exhaust gas and NOx concentration occurring in the power station sector.

The complicated processes taking place in the SCR process can be described in a simplified form by equations (1) and (2)

$$4NO + O_2 + 4NH_3 \rightarrow 4N_2 + 6H_2O \quad (1)$$

$$NO_2 + NO + 2NH_3 \rightarrow 2N_2 + 3H_2O \quad (2)$$

Such an SCR process can also be used in a modified form for the removal of nitrogen from diesel-engine exhaust gases. For use in a diesel-operated motor vehicle, in particular a commercial vehicle, numerous processes for the reduction of nitrogen oxides in exhaust gases by controlled $NH_3$ addition are therefore described, for example in; (1) Lepperhoff G., Schommers J.: Verhalten von SCR-Katalysatoren im dieselmotorischen Abgas [Behaviour of SCR catalysts in diesel-engine exhaust gas]. MTZ 49, (1988), 17–21; (2) Hüthwohl G., Li Q., Lepperhoff G.: Untersuchung der NOx-Reduzierung im Abgas von Dieselmotoren durch SCR-Katalysatoren [Investigation of NOx reduction in the exhaust gas of diesel engines by SCR catalysts]. MTZ 54. (1992), 310–315; and (3) Maurer B., Jacob E., Weisweiler, W.: Modellgasuntersuchungen mit NH3 und Harnstoff als Reduzierungsmittel für die katalytische NOx-Reduktion [Model gas investigations with $NH_3$ and urea as reducing agents for catalytic NOx reduction]. MTZ 60 (1999), 398–405.

The unknown $NH_3$ charging state (filling level) of the SCR catalyst in non-steady-state operation proves to be problematical. It is characterized by adsorption and desorption, which occur at different catalyst temperatures. Furthermore, the mass throughput or space velocity of the exhaust-gas flow and the content of NOx or $NH_3$ in the exhaust gas also affect the charging state. The ageing of the catalyst is also a factor which must not be ignored.

Figure 1:
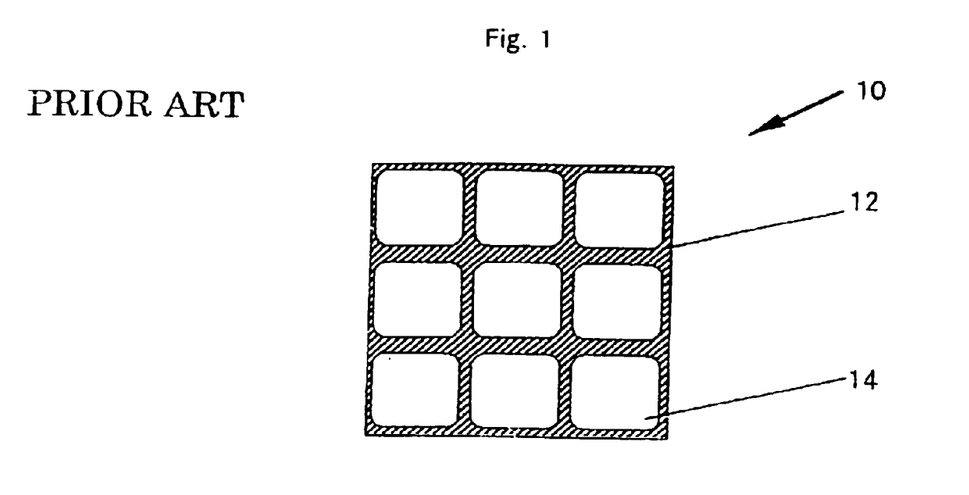
FIG. 1 schematically shows a detail from a cross section of a typical SCR catalyst, a so-called 'unsupported catalyst'.

FIG. 1 schematically shows a detail from a cross section of a typical SCR catalyst 10. Here, the porous catalyst material 12 is permeated by channels 14 through which the exhaust gas flows, also known as 'cells'. The cell density of such materials may be up to several hundred cells per square inch. With this structure, the porous catalyst material 12 has three tasks: primarily, the constituents of the catalyst permit the desired reaction processes within the available temperature range, furthermore the extruded material provides a mechanically sturdy unit which does not require any additional support components, and finally it permits the adsorption and desorption of $NH_3$.

Figure 2:
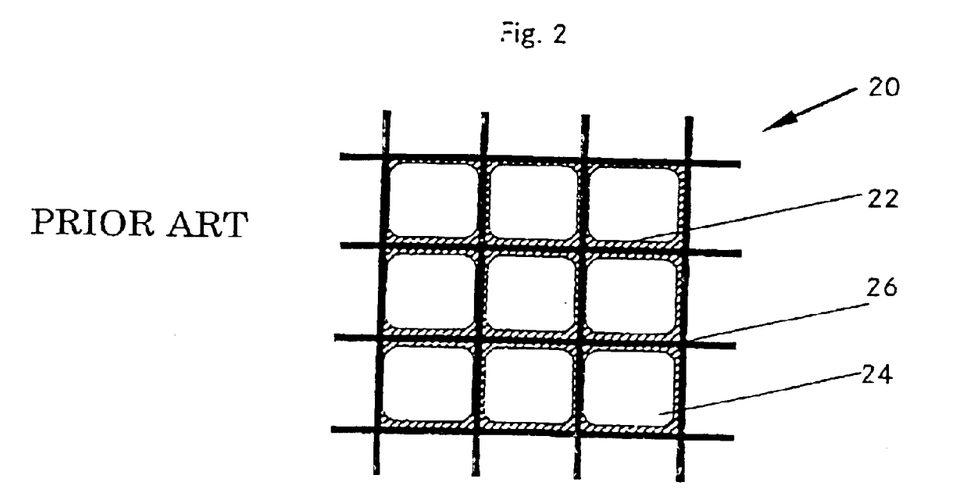
FIG. 2 schematically shows a detail from a cross section of a further typical SCR catalyst, a so-called 'supported catalyst'.

In the case of the supported catalyst 20 shown in FIG. 2, the actual catalyst material is applied as a coating 22 to a substrate 26, for example cordierite. The substrate 26 likewise has channels 24 through which the exhaust gas flows.

Figure 3:
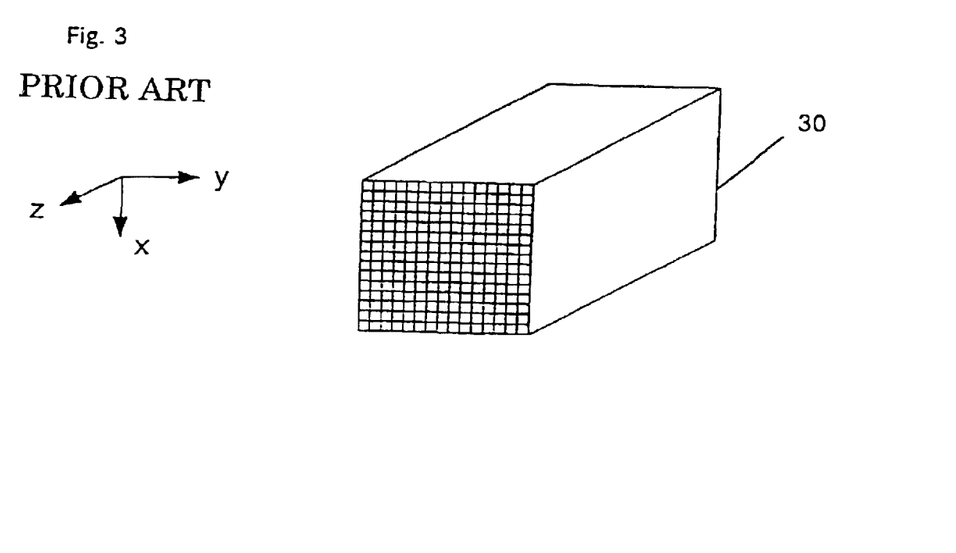
FIG. 3 shows a schematic overall view of the catalyst.

A schematic overall view 30 of a catalyst is represented in FIG. 3.

The exhaust gas flows in the z direction.

Figure 4:
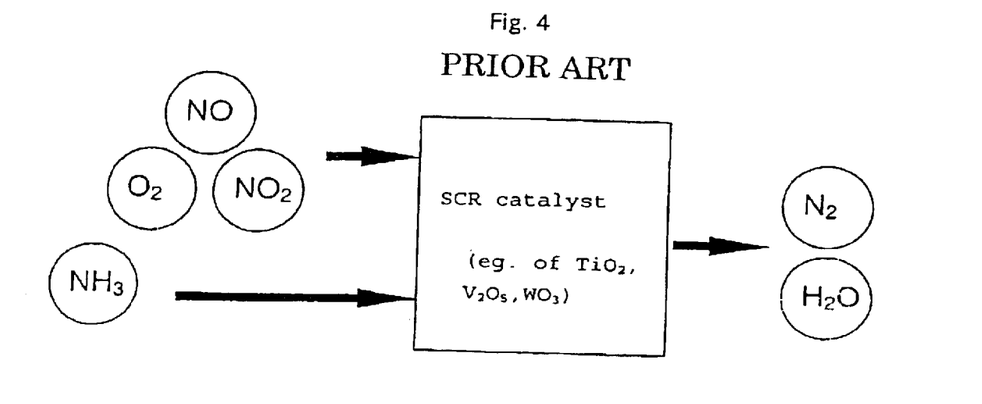
FIG. 4 schematically shows the processes taking place during the selective ammonia reduction on the SCR catalyst.

As FIG. 4 reveals, a typical catalyst material, shown here by way of example, consists of the semiconductor metal oxides titanium oxide ($TiO_2$), vanadium oxide ($V_2O_5$) and tungsten oxide ($WO_3$). These semiconductor metal oxides can change their physical properties, in particular their electrical properties such as conductivity and permittivity, with the chemical composition or by the adsorption of $NH_3$ surface charges.

Figure 5A:
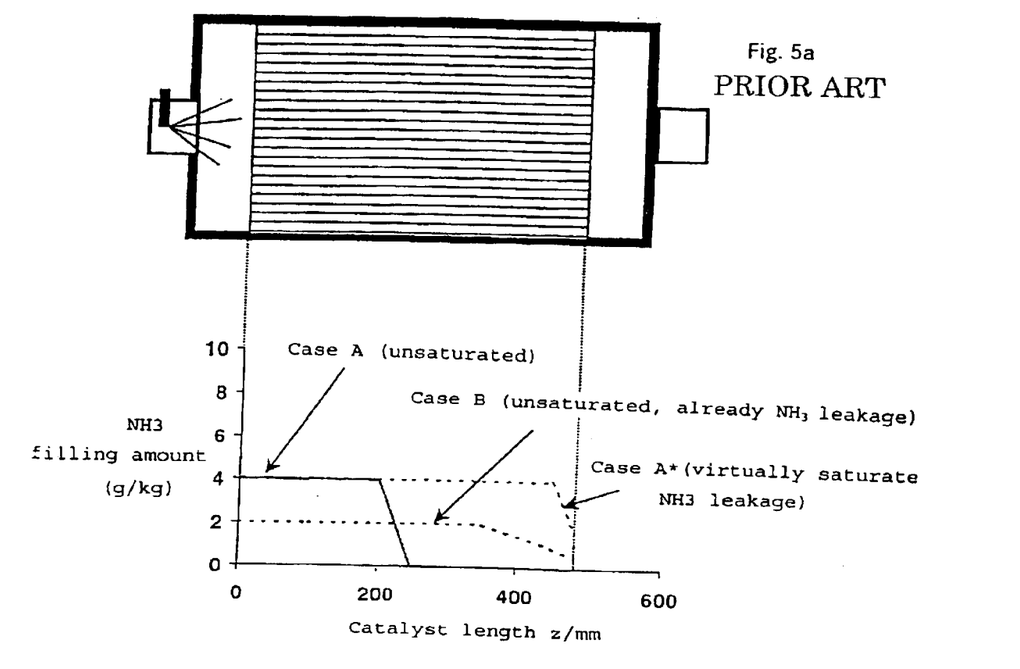
FIGS. 5a and 5b show by way of example the mass of $NH_3$ adsorbed over the length of the catalyst for two different catalyst temperatures.

The amount of $NH_3$ supplied to the catalyst is partly converted directly on the surface with NOx and the remainder is adsorbed in the porous catalyst layer. If more ammonia than can be converted by the reaction with NOx is supplied, adsorption of the excess ammonia occurs in a way corresponding to the profile sketched in FIG. 5a. FIG. 5a shows in case A a catalyst saturated with $NH_3$ at the inlet of the catalytic converter. Assumed by way of example is a maximum adsorption capacity of 4 g of $NH_3$/kg of catalyst mass. The $NH_3$ mass not reacting with NOx can no longer continue to be adsorbed at the inlet of the catalytic converter and, in the example represented, only finds adsorption possible again after about 200 mm of the length of the catalyst. An '$NH_3$' front is formed, descending over the length of the catalyst from the saturated state to 0 g/kg. If the excess supply of $NH_3$ continues, this $NH_3$ front moves in the direction of the outlet of the catalytic converter. In case A* represented, part of the excess $NH_3$ is already emitted ($NH_3$ leakage) even though the catalyst is not yet saturated over the entire length.

Figure 5B:
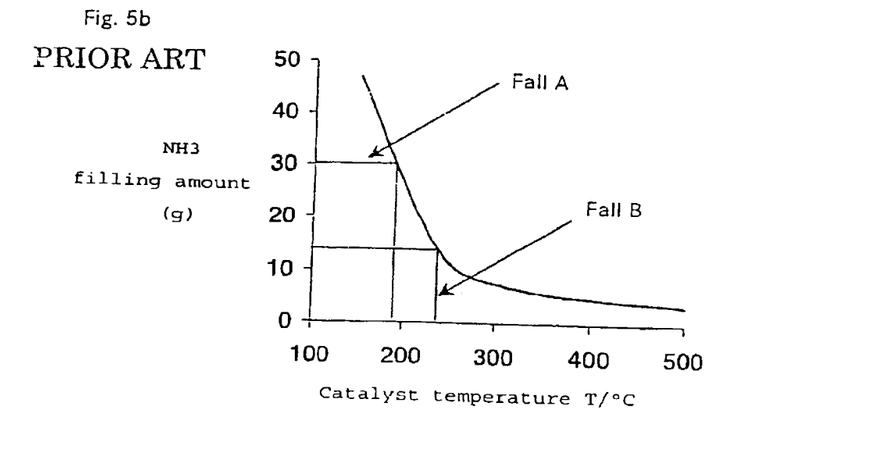

The adsorption capacity of the catalyst is dependent on the catalyst temperature. Case B in FIG. 5a shows the amount of adsorption over the length of the catalyst for an increased temperature. With approximately equal $NH_3$ leakage, the integrally stored amount of $NH_3$ in case B is significantly reduced, see also FIG. 5b.

With a controlled addition of $NH_3$, determination of the $NH_3$ filling level is performed by computation and so far it has not been possible for this to be verified by measurement. To prevent $NH_3$ breakthrough, the adsorption capacity of the catalyst must not be used up completely on account of the relatively inaccurate computation of the filling level; as a safety measure, additional storage volume must be kept in reserve, taking up additional installation space.

In the event of malfunctions, so far it has not been possible for an increased filling level to be detected. Changes in the NOx emission of the engine—for example due to changed ambient conditions (atmospheric humidity, air temperature), engine ageing, production variations, etc.—, or changes in the catalyst properties (for example ageing, reduction in the adsorption capacity) influence the mass of $NH_3$ to be adsorbed in the catalyst and are not covered by the filling level calculation.

To ensure a correct metered amount of the reducing agent ammonia or an ammonia-forming compound, such as urea for example, the literature proposes use of one or more exhaust-gas sensors for regulating the amount of the metered agent. Thus, EP 0 554 766 A 1 presents a method which requires one or two NOx sensors. DE 41 17 143 A1 proposes a method which requires one $NH_3$ sensor and DE 42 17 552 C1 proposes a method in which two $NH_3$ sensors prove to be necessary. For a further method, proposed in DE 195 36 571 A1, an $NH_3$ sensor is likewise indispensable.

All the methods mentioned employ control methods which are very complex and scarcely cover all eventualities, since, as stated above, the charging state of the SCR catalyst is dependent on very many operating parameters, which also to a great extent involve the prehistory, i.e. earlier operating states.

If it were possible to detect the charging state of the SCR catalyst by a suitable method, it would be possible to dispense with the exhaust-gas sensors mentioned above, or under certain circumstances only one $NH_3$ sensor would have to be fitted in the exhaust pipe as a switch, in order to diagnose a malfunction. It would be possible to dispense with complex and inaccurate control strategies. In addition, the volume of the catalytic converter (and consequently the installation space required) could be reduced by that part which has to be provided in the ase of exclusively open-loop controlled systems to allow additional adsorption in the catalyst of excessively metered amounts caused by inaccurate calculation of the stored amount of $NH_3$ and prevent harmful $NH_3$ leakage.

In U.S. Pat. No. 5,546,004 there is a description of a sensor for determining the storage state of an SCR catalyst. This involves measuring the electrical conductivity of a material which is identical to the SCR catalyst material with regard to its physical properties. The recording of the electrical conductivity takes place within the material at a plurality of points which are at different distances from the surface of the material around which the exhaust gas flows. The measurement of the variation in electrical conductivity in dependence on the depth of the material allows conclusions to be drawn concerning the concentration of the substance adsorbed on the sensor material.

DE 196 35 977 A1 describes a method for determining the storage state of an NOx storage catalyst. This involves sensing a physical property of the catalyst material changing chemically with the NOx storing process, a measuring pickup being applied to the NOx storage material.

Alternatively, a material which is identical with regard to its physical properties may also undergo measurement directly.

SUMMARY OF THE INVENTION

The invention is based on the object of providing a method for detecting the storage state of an SCR catalyst which can be realized costeffectively and with which $NH_3$ leakage can be avoided with a great safety margin.

According to the invention, the change in at least one physical property of the SCR catalyst material, changing with the $NH_3$ storing process, is sensed, the measurement taking place on the SCR catalyst material itself by applying a measuring pickup to the SCR catalyst material or bringing it into direct contact with the latter and determining the storage state, for example the filling level, on the basis of these results. Alternatively, a sensor whose function-determining element consists of the same or a similar material or a material of the same physical properties (referred to hereafter as 'substitute material') may be introduced into the exhaust-gas stream, in order to infer from the physical properties of this substitute material the storage state of the SCR catalyst. In this case, the measurement takes place on the substitute material by applying the substitute material to the measuring pickup.

In both alternatives of the method, consequently the physical properties of the SCR catalyst material, or of the substitute material itself are sensed. These methods have major advantages over indirect methods, in which measuring signals outside the SCR catalyst or the substitute material (for example $NH_3$ breakthrough) are used to conclude their properties.

In this case, the measuring pickup is applied directly to the SCR catalyst.

In an advantageous embodiment of the invention, the sensing of the physical property takes place at a plurality of points of the SCR catalyst, so that a location-dependent determination of the storage state is possible.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

Exemplary embodiments of the invention are explained below with reference to drawings. In the drawings, FIGS. 1 to 5 serve for explaining the technical principles on which the invention is based. FIGS. 6 to 11 show embodiments according to the invention. To be specific:

DETAILED DESCRIPTION OF THE PREFERRED EMBODIMENT

In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 6:
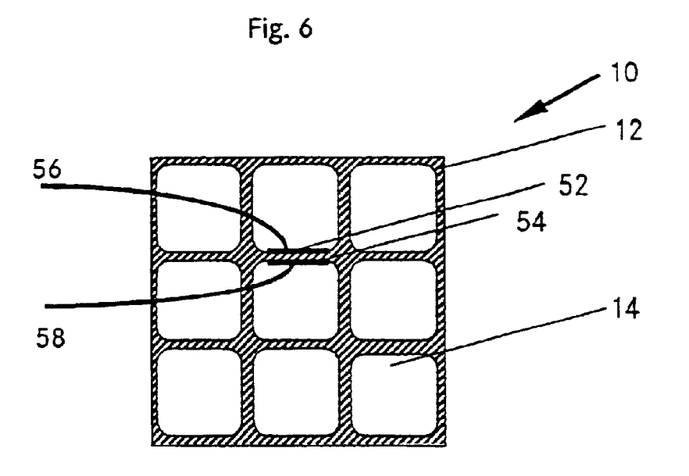
FIG. 6 shows one possible arrangement of measuring pickups on the catalyst according to the invention.

According to FIG. 6, two electrodes 52, 54 are applied to a catalyst 12. In the embodiment shown, these electrodes, which are preferably but not necessarily of a porous and gas-permeable configuration, are arranged in a planar manner on two opposite walls of the catalyst. They form a lossy capacitor, which can undergo measurements with the aid of the electrical terminals 56 and 58. The complex impedance Z between the two terminals 56 and 58 then represents a measure of the charging state of the catalyst. If accuracy so requires, recourse can also be made to further measuring signals, usually present in any case, such as the exhaust-gas temperature, catalyst temperature, air ratio λ, engine speed, load moment or air mass stream, in order with the aid of these measured values to determine the charging state of the catalyst and consequently calculate and control the metering of the reducing agent.

The complex electrical impedance Z is defined in the present application such that it also includes the electrical d.c. resistance. The complex electrical impedance Z is defined in this sense as the sum of the real part Re(Z) and the imaginary part Im(Z) of the complex impedance Z. The electrical impedance Z changes with the measuring frequency applied. Suitable as the frequency range is the range between 0 Hz (d.c. voltage) and an upper cut-off frequency, at which the wavelength corresponding to the measuring frequency is significantly less than the dimensions of the measuring arrangement. Preferably, a suitable measuring frequency will be selected and the complex impedance determined from the real part and imaginary part at this frequency, or a measuring signal derived from both or one of these two variables will be recorded. The typical measured variables may be: the amount of the complex impedance $|Z|$, the d.c. resistance, the capacitance, the unbalance of an electrical bridge circuit, the loss factor or the off-resonance of a resonant circuit.

Figure 7A:
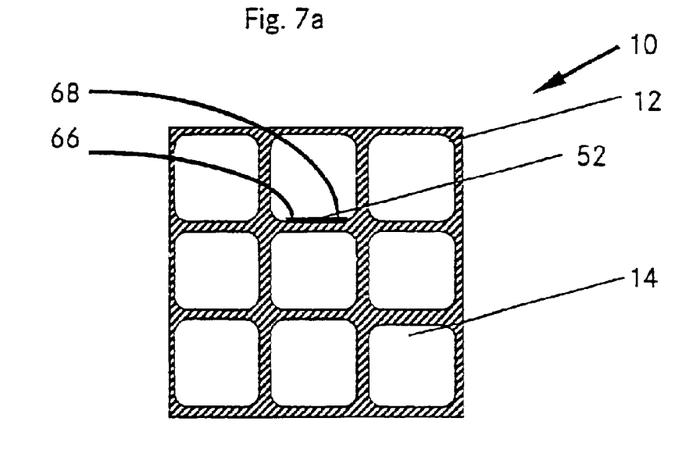
FIG. 7a shows a further possible, particularly simple, arrangement of measuring pickups on the catalyst according to the invention.
Figure 7B:
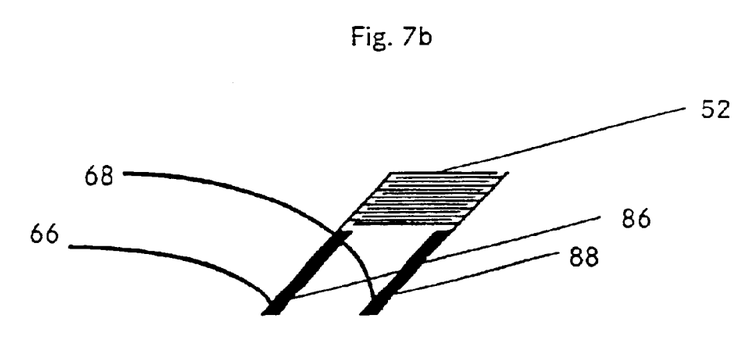
FIG. 7b is a perspective representation of FIG. 7a which serves for a more detailed explanation.

Alternatively, the electrodes may also comprise a structure, of whatever kind, that allows the electrical properties of the catalyst material to be diagnosed. FIG. 7a shows an inter-digital capacitor arrangement 52 applied to the catalyst, which has the advantage that an electrode arrangement has to be applied only on one side. The contacting with the supply leads 66 and 68 can then likewise take place from one side. FIG. 7b illustrates this by the perspective representation. In FIG. 7b, only the inter-digital capacitor arrangement itself is sketched; the catalyst material has not been depicted for the sake of overall clarity.

The contacting may take place, for example, from the front, since the electrical supply leads 86 and 88 have been chosen to be just long enough to reach the front edge of the catalyst.

Likewise possible is an arrangement of a measured-value pickup in the form of an electrical conductor loop, which is appropriate if the catalyst material is sufficiently lossy and sufficiently electrically conductive.

Measuring pickups may also be applied at a plurality of locations of the catalyst, so that a determination of the charging state is possible not only with respect to time but also with respect to location. It is possible here for measuring pickups to be applied both along the exhaust-gas stream, i.e. in the z direction according to FIG. 3, or at various x or y values, in order to measure the locally changing charge distribution.

Figure 8:
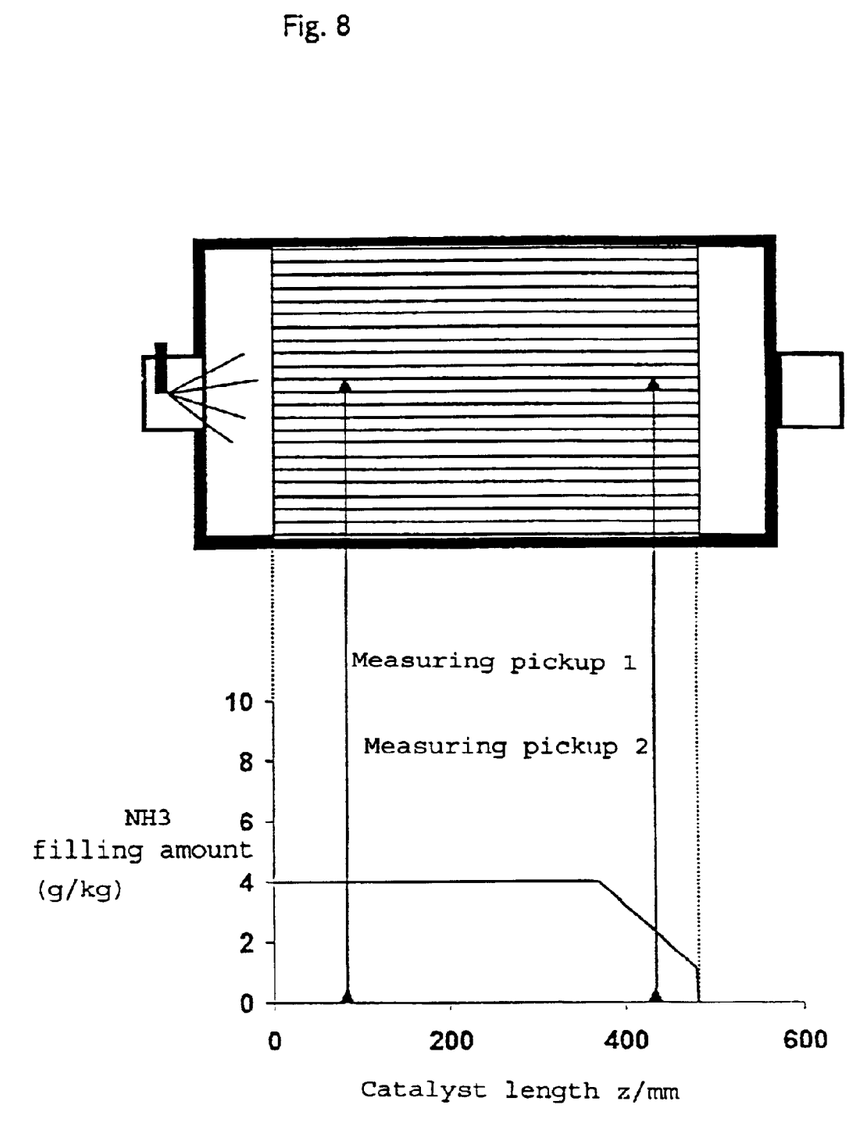
FIG. 8 shows the arrangement of two filling level sensors at the inlet and end of the catalytic converter according to the invention and the different filling levels over the length of the catalyst of a partially filled catalyst.

In a particularly simply structured arrangement, two or more measuring pickups may be provided at different z values along the exhaust-gas stream, the first being placed for example near the inlet of the catalytic converter and the second for example in the last quarter of the catalyst, to allow, as sketched in FIG. 8, determination of on the one hand the amount of adsorption in the saturated state (inlet of the catalytic converter) and in addition the safety margin against $NH_3$ leakage (near the outlet of the catalytic converter). The comparison of the actual $NH_3$ level in the saturated state (inlet of the catalytic converter) with a temperature-dependent desired value allows conclusions to be drawn, for example concerning the ageing state or concerning damage to the catalyst, and makes it possible to adapt the metered amount correspondingly, right up to the emergency function. The $NH_3$ level in the region of the outlet of the catalytic converter provides information on the safety margin against $NH_3$ breakthrough. If a temperature-dependent desired value is exceeded, a reduction in the metered amount is directly possible, and it is also conceivable to regulate the filling level within narrow limits around the prescribed desired value.

Figure 9:
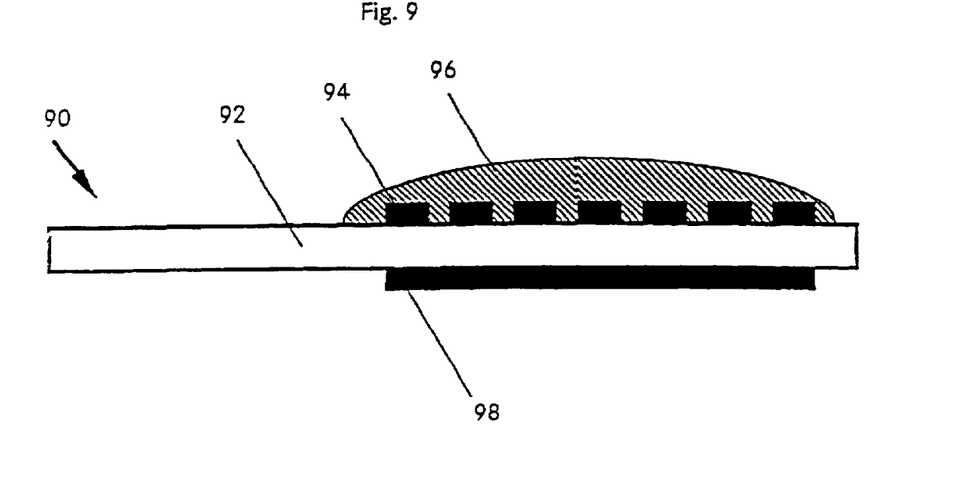
FIG. 9 shows the sectional drawing of an arrangement by way of example for measuring the complex impedance of a substitute material, which is present in the exhaust line in addition to the catalyst, according to the invention.

In a further configuration, the catalyst itself is not provided with measuring pickups (for example with electrodes), but instead a sensor whose function-determining element consists of a substitute material is introduced into the catalyst. Here, too, a single sensor may be introduced or a plurality of locationally distributed sensors may be introduced. FIG. 9 shows the sectional drawing of an arrangement by way of example for measuring the complex impedance of the substitute material, which is present in addition to the catalyst in the exhaust line. The basic construction of the arrangement is similar to the arrangements in EP 0 426 989 A1 or U.S. Pat. No. 5,143,696 or in Plog C., Maunz W., Kurzweil P., Obermeier E., Scheibe C.: Combustion gas sensitivity of zeolite layers on thin-film capacitors. Sensors and Actuators B 24–25 (1995) 403406. A layer 96 is applied to a transducer 90, comprising a heater 98 on the underside of a substrate 92—preferably made of ceramic, quartz or silicon—and a suitable electrode structure 94 (preferably in an inter-digital structure) on the upper side of the substrate. Lines provided on the transducer 90 allow the electrical impedance to be measured. The arrangement is installed in a suitable housing and is positioned in the exhaust line in the way described above. By contrast with the literature references referred to above, the layer 96 does not consist of a gas-elective material, but of the substitute material for the SCR catalyst. Therefore, the charging state can be detected with the aid of an arrangement of this type. If need be, a plurality of such arrangements may also be introduced into the catalyst at various locations. The explanatory comments made above apply in this respect.

The electrical heater 98 comprises, for example, 100 nm to 20 μm thick sheets of metal, for example platinum. The substitute material 96 has, for example, a layer thickness of between 100 nm and 1000 μm.

The electrode structure 94, for example made of a metal, has for example a layer thickness of 100 nm to 100 μm, depending on the technology.

To be able to measure the physical properties of the catalyst which characterize the charging state, other electrical measured variables may also be used, for example the Seebeck coefficient (also known as the thermal electromotive force), or the response to temperature changes of the electrical variables referred to above.

Further non-electrical measured variables which may be used, by way of example, are the change in mass or volume.

Figure 10:
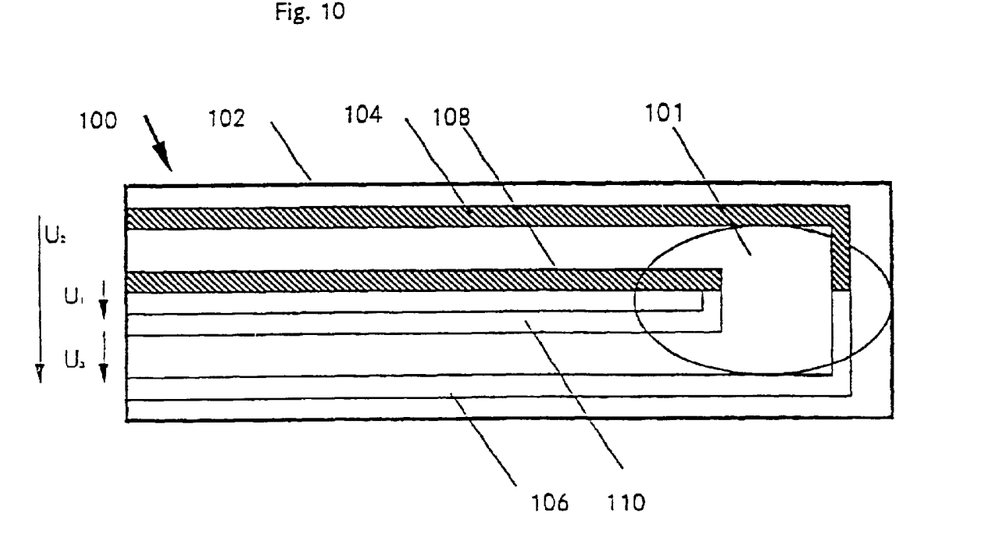
FIG. 10 shows the sectional drawing of an arrangement by way of example for measuring the thermal electromotive force of a substitute material, which is present in the exhaust line in addition to the catalyst, according to the invention.

The plan view of an arrangement given by way of example of how the charging state can be detected by means of measuring the thermal electromotive force is sketched in FIG. 10. A layer of the substitute material 101 is applied to a transducer 100, comprising a heater (not represented) on the underside of an electrically insulating substrate 102 (preferably made of ceramic, quartz or silicon) and thermocouples 104, 106, 108, 110 on the upper side of the substrate. The electrical heater comprises, for example, 100 nm to 100 μm thick sheets of metal.

The metallic conductors 104 and 106 as well as 108 and 110 are electrically connected to one another at the contact points and each form a pair of thermocouples. Typical suitable combinations of materials for the pairs of thermocouples are NiCr/Ni or T/TRh. Lines provided on the transducer 100 allow the voltages $U_1$ (voltage between 108 and 110) and $U_2$ (voltage between 104 and 106) to be measured. The arrangement is installed in a suitable housing and positioned in the exhaust line in such a way that the layer of substitute material 101 is exposed to the exhaust gas. The heater structure is designed in such a way that different temperatures occur at the contact points of the two pairs of thermocouples. The difference in the voltages $U_1$ and $U_2$ is proportional to the temperature difference $\Delta T$ at the contact points—provided that the temperatures at the contact points do not differ too much. The proportionality factor results from the chosen combination of materials. The voltage $U_3$ (voltage between 106 and 110) is a linear function of the temperature difference $\Delta T$ and the thermal electromotive force of the substitute layer 101, which is a material parameter. Therefore, the charging state can also be detected with the aid of an arrangement of this type.

The change in mass of the storage material caused by the adsorption-desorption cycles can be measured by means of piezoelectric sensors. Quartz-crystal micro-balances may be used for example for this purpose. A possible construction is sketched in FIG. 11. Here, the excitation electrodes 112 and 114 of a, for example AT-cut, vibrating quartz crystal 111 (thickness shear mode oscillator) are coated on one or both sides with the substitute material 116 and 117.

Figure 11:
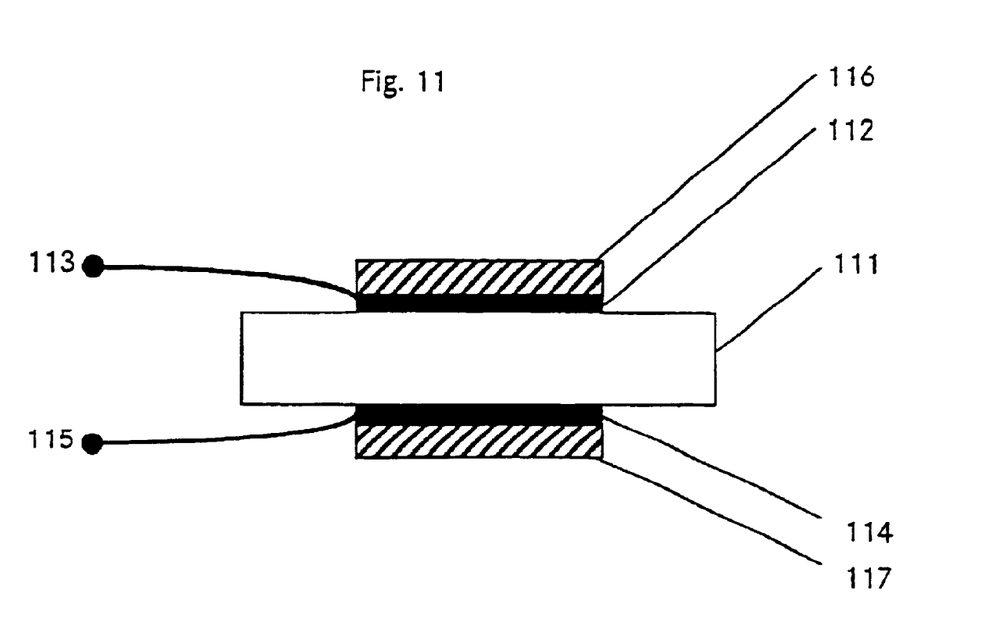
FIG. 11 shows the sectional drawing of an arrangement by way of example for measuring the amount of adsorption of a substitute material, which is present in the exhaust line in addition to the catalyst, according to the invention.

The change in mass, induced by adsorption or desorption of the gases to be stored in the substitute material, brings about a change in the electrical equivalent circuit diagram parameters of the crystal two-terminal network between the electrical terminals 113 and 115, characterizing the mechanical properties of the quartz crystal. The likewise changing mechanical resonant frequency of the vibrating quartz crystal can likewise be used as a measuring signal. For this purpose, the quartz crystal is to be used as a frequency-determining element of an oscillator circuit. The resulting shift in the oscillation frequency is proportional to the change in mass of the layer of the substitute material wetting the quartz crystal and consequently characterizes the charging state of the catalyst.

When the propagation path of the surface wave of a surface wave sensor (SAW=Surface Acoustic Wave) is coated with the substitute material, the propagation rate of the surface wave changes with the storage state of the coating material. The resultant change in frequency of an SAW oscillator arrangement can likewise be used as a measuring signal for the charging state.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. Method for determining the storage state of an ammonia-adsorbing SCR catalyst having at least one channel for receiving gas flow, wherein the change in at least one physical property of the SCR catalyst changes on account of the $NH_3$ storing process, said method comprising:

applying a measuring pickup to at least one interior surface of said at least one channel of said the SCR catalyst;

sensing an electrical impedance of the SCR catalyst from said measuring pickup wherein the sensing of the impedance takes place at one or more frequencies from the frequency range between 0 Hz and an upper cut-off frequency, at which the wavelength corresponding to the measuring frequency is significantly less than the dimensions of the measuring pickup; and determining the storage state of the SCR catalyst on the basis of said electrical impedance.

2. Method according to claim 1, wherein the sensing of the electrical impedance is carried out at a plurality of points of the SCR catalyst.

3. Method according to claim 2, wherein one of said plurality of points is near the inlet of the SCR catalyst, and another of said plurality of points is disposed in the rearward quarter of the SCR catalyst.

4. Method according to claim 1, wherein the sensing of the electrical impedance occurs with either two electrodes, a conductor loop, or an inter-digital structure.

5. Method for determining the storage state of an ammonia-adsorbing SCR catalyst having at least one channel for receiving gas flow, wherein the change in at least one physical property of the SCR catalyst changes on account of an $NH_3$ storing process, said method comprising:

applying a measuring pickup to at least one interior surface of said at least one channel the SCR catalyst;

sensing one of a thermal electromotive force of the SCR catalyst and the SCR catalysts' response to temperature changes, said sensing being provided by said measuring pickup; and determining the storage state on the basis of said one of said thermal electromotive force and the catalysts' response to temperature changes.

6. The method according to claim 5, wherein the sensing is carried out at a plurality of points of the SCR catalyst.

7. The method according to claim 6, wherein one of said plurality of points is near an inlet of the SCR catalyst, and another one of said plurality of points is disposed in the rearward quarter of the SCR catalyst.

* * * * *